(12) United States Patent
Qiu et al.

(10) Patent No.: US 9,890,284 B2
(45) Date of Patent: Feb. 13, 2018

(54) PROCESS AND APPARATUS FOR PREPARING PIGMENT AND WAX DUAL DISPERSIONS

(71) Applicant: XEROX CORPORATION, Norwalk, CT (US)

(72) Inventors: Shigang Qiu, Toronto (CA); Michael D'Amato, Thornhill (CA); Frank Ping Hay Lee, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 930 days.

(21) Appl. No.: 14/254,499

(22) Filed: Apr. 16, 2014

(65) Prior Publication Data

US 2015/0299466 A1 Oct. 22, 2015

(51) Int. Cl.
*C08L 91/06* (2006.01)
*C08K 5/42* (2006.01)
(Continued)

(52) U.S. Cl.
CPC ............ *C08L 91/06* (2013.01); *B01F 3/0807* (2013.01); *B01F 5/10* (2013.01); *B01F 5/104* (2013.01); *B01F 5/12* (2013.01); *B01F 7/0075* (2013.01); *B01F 13/103* (2013.01); *B01F 15/06* (2013.01); *B01F 15/065* (2013.01); *C08K 5/3417* (2013.01); *C08K 5/42* (2013.01); *B01F 2015/0221* (2013.01); *B01F 2015/061* (2013.01); *B01F 2215/0059* (2013.01)

(58) Field of Classification Search
None
See application file for complete search history.

(56) References Cited

U.S. PATENT DOCUMENTS 7,556,679 B2 * 7/2009 Lee .................... B01F 7/00766
106/31.13
8,080,360 B2 * 12/2011 Marcello ................... C08F 6/18
430/137.14

(Continued)

*Primary Examiner* — Abbas Rashid
(74) *Attorney, Agent, or Firm* — MH2 Technology Law Group LLP

(57) ABSTRACT

Disclosed herein are formulations and processes for the preparation of pigment and wax dual dispersions by (1) providing a solution comprising a water and at least one surfactant in a dispersion apparatus comprising a container, a rotor-stator homogenizer, and a piston homogenizer coupled via a recirculation device; (2) adding at least one pigment to the solution; (3) forming a pigment dispersion by flowing the at least one pigment and the solution to the rotor-stator homogenizer via the recirculation device; (4) adding at least one wax to the pigment dispersion; and (5) flowing the at least one wax and pigment dispersion to the piston homogenizer via the recirculation device until a pigment and wax dual dispersion is formed. Also disclosed herein are pigment and wax dual dispersions, as well as a dispersion apparatus for preparing pigment and wax dual dispersions. In certain embodiments, a dispersion apparatus for preparing a pigment and wax dual dispersion may comprise a container, a rotor-stator homogenizer, a piston homogenizer, and a recirculation device coupled to the container and the homogenizers that allows a dispersion to flow between the container and the homogenizers.

11 Claims, 2 Drawing Sheets

(51) Int. Cl.
*C08K 5/3417* (2006.01)
*B01F 15/06* (2006.01)
*B01F 5/10* (2006.01)
*B01F 7/00* (2006.01)
*B01F 3/08* (2006.01)
*B01F 5/12* (2006.01)
*B01F 13/10* (2006.01)
*B01F 15/02* (2006.01)

(56) References Cited

U.S. PATENT DOCUMENTS

| | | | | |
|---|---|---|---|---|
| 8,450,539 B2* | 5/2013 | Hassan | ................ | B01F 3/0807 |
| | | | | 208/20 |
| 9,182,691 B2* | 11/2015 | Lawton | ................ | G03G 9/0804 |
| 9,329,508 B2* | 5/2016 | Lawton | ................ | G03G 9/0804 |
| 2004/0137357 A1* | 7/2004 | Bartel | ................ | C08J 3/215 |
| | | | | 430/137.14 |
| 2005/0181294 A1* | 8/2005 | Hopper | ................ | C08J 3/215 |
| | | | | 430/105 |
| 2005/0272851 A1* | 12/2005 | Agur | ................ | C08K 5/0008 |
| | | | | 524/487 |
| 2006/0166121 A1* | 7/2006 | Patel | ................ | G03G 9/0804 |
| | | | | 430/109.4 |
| 2007/0025178 A1* | 2/2007 | Kao | ................ | B01F 5/102 |
| | | | | 366/136 |
| 2008/0213687 A1* | 9/2008 | Keoshkerian | ........ | G03G 9/0806 |
| | | | | 430/137.14 |
| 2008/0220362 A1* | 9/2008 | Moore | ............... | G03G 9/08711 |
| | | | | 430/113 |
| 2009/0053631 A1* | 2/2009 | Matsumura | .......... | G03G 9/0827 |
| | | | | 430/48 |
| 2011/0036257 A1* | 2/2011 | Lawrence | .......... | C08G 18/0823 |
| | | | | 101/491 |
| 2012/0052429 A1* | 3/2012 | Wosnick | ............ | G03G 15/2092 |
| | | | | 430/105 |

* cited by examiner

PROCESS AND APPARATUS FOR PREPARING PIGMENT AND WAX DUAL DISPERSIONS

TECHNICAL FIELD

The present disclosure relates to formulations and processes for the preparation of pigment and wax dual dispersions. In certain embodiments, the processes may comprise a single dispersion apparatus and may therefore be referred to as "one pot" processes. Processes disclosed herein may comprise preparing a pigment and wax dual dispersion by (1) providing a solution comprising water and at least one surfactant in a dispersion apparatus comprising a container, a rotor-stator homogenizer, and a piston homogenizer coupled via a recirculation device; (2) adding at least one pigment to the solution; (3) flowing the pigment and the solution to the rotor-stator homogenizer via the recirculation device to form a pigment dispersion; (4) adding at least one wax to the pigment dispersion; and (5) flowing the at least one wax and the pigment dispersion to the piston homogenizer via the recirculation device until a pigment and wax dual dispersion is formed.

Also disclosed herein are pigment and wax dual dispersions, as well as a dispersion apparatus for preparing pigment and wax dual dispersions. In certain embodiments, a dispersion apparatus for preparing a pigment and wax dual dispersion may comprise a container, a rotor-stator homogenizer, a piston homogenizer, and a recirculation device coupled to the container and the homogenizers that allows a dispersion to flow between the container and the homogenizers.

BACKGROUND

Toners, for use in printers, copiers, and the like, may be prepared by existing mechanical reduction processes, such as a conventional styrene acrylate copolymer based toner process. In such processes, the copolymer resin may be melt kneaded or extruded with a pigment, pulverized and classified to provide toner particles of the desired volume average particle diameter and size distribution.

As an improvement to the foregoing mechanical reduction process, other processes are known in which toner may be prepared via aggregation as opposed to particle size reduction. For example, in chemical aggregation processes, toner may be formed chemically in situ and may not require known pulverization methods. Chemical aggregation processes typically involve the formation of an emulsion latex of the resin particles, in which particles have a small size of, for example, from about 5 nanometers to about 500 nanometers in diameter, by heating the resin in water, or by making a latex in water using an emulsion polymerization method. A colorant dispersion of a pigment dispersed in water may also be separately formed. The colorant dispersion is added to the emulsion latex mixture, and an aggregating or complexing agent is then added to form aggregated toner particles. The aggregated toner particles are then heated to enable coalescence or fusing, thereby achieving aggregated, fused toner particles.

In a pigment dispersion, in order for the pigment particles to form aggregates with the latex particles, the pigment particles should have a size smaller or at least a size comparable to the latex particles, such as between about 5 and about 300 nanometers in diameter, or between about 5 and about 150 nanometers in diameter. There are several well-known methods in the art to prepare pigment dispersions with a particle size less than about 300 or less than about 150 nanometers in diameter, including, for example, the use of a liquid jet interaction apparatus, such as a microfluidizer, to prepare pigment dispersions for use in ink jet inks. Other examples include the preparation of pigment dispersions using a media mill, a ball mill, or an attritor. However, the media mill and the ball mill are known to generate contaminants from the media-media impaction, and the liquid jet interaction apparatus may be prone to mechanical breakdown as a result of high application pressure.

Rotor-stator type homogenizers have been widely used to prepare emulsions and dispersions. However, the particle size achievable with traditional rotor-stator homogenizers may not be as small as those with media mills or high-pressure homogenizers equipped with homogenizing valves or liquid jet interaction chambers.

Currently, pigment dispersion for manufacturing emulsion aggregation (EA) toner may either be dispersed by a high-energy in-line homogenizers or microfluidizers or purchased from a vendor. The pigment dispersions and wax dispersions are then shipped from the place of manufacture or vendor to toner making facilities. Costs associated with processing and transporting pigment dispersions and wax dispersions may be a major component of the overall EA toner manufacturing cost.

Disclosed herein are pigment and wax dual dispersions that can be prepared in a single pot, referred to herein as a dispersion apparatus. In certain embodiments, the one-pot processes disclosed herein may result in significant cost reductions and process efficiencies for the production of toners and inks. The advantages of using a one-pot homogenization process in a single dispersion apparatus for a pigment and wax dual dispersion preparation may, for example, include the following: (1) elimination of two individual dispersion processes; (2) simplification of the processes; (3) increase in productivity and reduction in production and transportation costs; (4) elimination of the need for wax dispersion and pigment dispersion outsourcing; and (5) maintenance of the same performance of the dual dispersions as each dispersion separately.

SUMMARY

Disclosed herein are processes for the preparation of pigment and wax dual dispersions comprising (1) providing a solution comprising a water and at least one surfactant in a dispersion apparatus comprising a container, a rotor-stator homogenizer, and a piston homogenizer coupled via a recirculation device; (2) adding at least one pigment to the solution; (3) flowing the at least one pigment and solution to the rotor-stator homogenizer via the recirculation device to form a pigment dispersion; (4) adding at least one wax to the pigment dispersion; and (5) flowing the at least one wax and pigment dispersion to the piston homogenizer via the recirculation device until a pigment and wax dual dispersion is formed.

Also disclosed herein are dispersion apparatuses for preparing pigment and wax dual dispersions comprising a container comprising a stirring mechanism, a rotor-stator homogenizer, a piston homogenizer, and a recirculation device coupled to the container and the homogenizers that allows a dispersion to flow between the container and the homogenizers.

Further disclosed herein are formulations for the preparation of various pigment and wax dual dispersions and products comprising pigment and wax dual dispersions, such as ink, toners, paints, and coating compositions.

Certain embodiments disclosed herein provide a solution in a dispersion apparatus that includes a container and a mixer that are operatively coupled via at least one recirculation device to a piston homogenizer and a rotor-stator homogenizer. The process may include adding pigment particles to the solution to form a pigment dispersion, flowing the pigment dispersion to the rotor-stator type homogenizer via the recirculation device, reducing a pigment particle size of the dispersion using the rotor-stator homogenizer, and recirculating the dispersion having reduced pigment particle size via the recirculation device. The process may further include adding wax to the solution to form a wax dispersion, flowing the wax dispersion to the piston homogenizer via the recirculation device, and recirculating the dispersion via the recirculation device. In this way, a pigment and wax dual dispersion may be obtained in a single dispersion apparatus.

Both the foregoing general summary and the following detailed description are exemplary only and are not restrictive of the disclosure.

DETAILED DESCRIPTION

Figure 1:
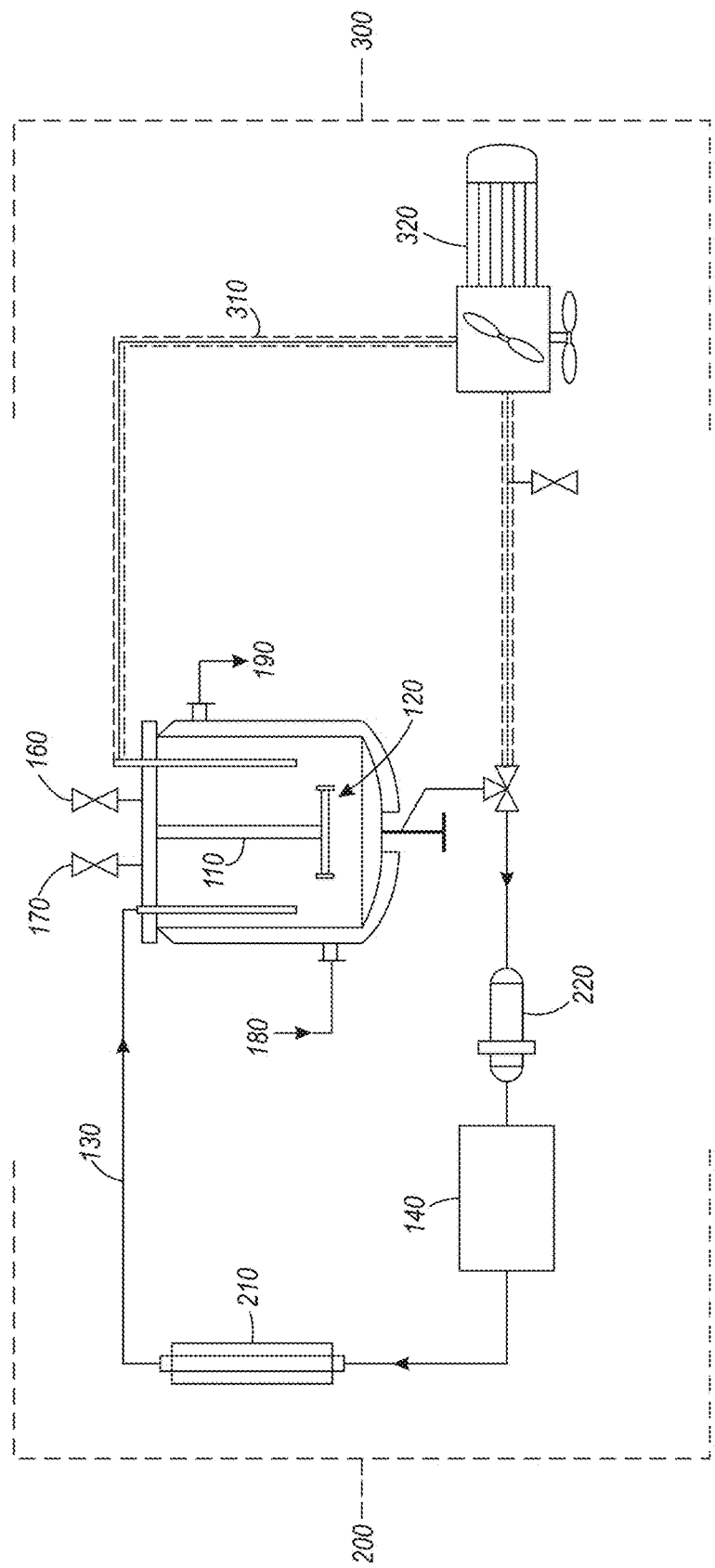
FIG. 1 is a schematic drawing of an exemplary embodiment of a dispersion apparatus as disclosed herein to allow for a pigment and wax dual dispersion in a one-pot homogenization process.

Emulsion Aggregation (EA) toner particles may be prepared by a process of controlled aggregation of finely divided and stabilized toner components such as polymer resins, pigments, waxes, and/or silica. Current EA toner processes may involve mixing of resin latexes, wax dispersions, and pigment dispersions, followed by homogenizing the resulting mixture while adding a metal ion coagulant to form aggregated toner particles with the desired particle size, terminating the growth of toner particles by adjusting the slurry pH, and finally coalescing the toner particles to the desired shape. Pigments utilized in EA toner process may be consumed in aqueous dispersion form, in which pigment particles are stabilized by a surfactant and dispersed in water. The same processes may be used for waxes in EA toner formulation.

Pigments used in EA toner process may be supplied in aqueous dispersion form, wherein pigment particles are dispersed in water, homogenized (or milled), and stabilized by a surfactant. Wax dispersions may be prepared at elevated temperatures using a piston homogenizer and may also be supplied in aqueous form.

Currently, pigment dispersions such as carbon black pigment dispersions may be prepared by high-energy in-line homogenizer processes, by microfluidizers, or purchased from vendors. Likewise, wax dispersions may be separately manufactured or purchased from vendors.

It is desirable to reduce the costs associated with processing and transporting custom pigment dispersions and wax dispersions for use as components of EA toners and inks. It is further desirable to combine the separate processes associated with formulating pigment dispersions and wax dispersions into a single efficient process that yields a stable pigment and wax dual dispersion having the same advantages and characteristics as each dispersion separately.

Disclosed herein are "one-pot" processes and formulations for the preparation of pigment and wax dual dispersions using a rotor-stator homogenizer and a piston homogenizer to form nano-scale particles dispersed in water. The "one-pot" dual-dispersion homogenization processes disclosed herein have the potential to replace two separate processes, thereby offering improved manufacturing efficiencies and cost reduction opportunities.

In certain embodiments, wax dispersions for manufacturing EA toners may be prepared by emulsifying a molten polyethylene or polymethylene wax in deionized water and surfactant using a piston homogenizer operating at about 6,000 psig pressure and temperature ranging from about 120° C. to about 130° C. The resulting emulsion typically contain about 30% solids by weight and the following particle size specifications: D50 Spec: 209±45 via W143 Nanotrac (243±45 nm via Omnova Brookhaven) and D95 Spec: 650 nm max. To manufacture EA toners, wax dispersions, which do not contain pigments, must be blended with pigment dispersions (aqueous dispersions of pigments in deionized water and surfactant).

The pigment and wax dual dispersion disclosed herein, however, may be suitable for use for manufacturing toners or inks.

As disclosed herein, a pigment and wax dual dispersion may be prepared by a multi-step process. A pigment concentrate may be prepared by any means known in the art. For example, in one embodiment the pigment concentrate may be prepared by using an immersion media mill. The pigment concentrate may comprise any desirable weight percent of pigment, such as for example, at least about 5 weight % of pigment, at least about 25 weight % of pigment, or at least about 50 weight % of pigment. The pigment concentrate may then be added to a solution comprising at least one surfactant.

In a subsequent step, an aqueous wax dispersion may be prepared from the pigment concentrate. In certain embodiments, the aqueous wax dispersion may be prepared using a piston homogenizer. The wax in the wax dispersion may be of any desired particle size. In certain embodiments, the average particle size of the wax dispersion can be similar to any known wax dispersions used for manufacturing EA toners, such as, for example, having a D50 of about 200 nm. In certain embodiments, the wax dispersion disclosed herein may be suitable for preparing a toner. At least one wax, such as a polymethylene wax (FNP92 type) from IGI, may then be dispersed with the pigment and surfactant mixture at an elevated temperature (such as, for example a temperature ranging from about 120° C. to about 130° C.) using a piston homogenizer. In one exemplary embodiment, there is provided a cyan pigment concentrate with an aqueous wax dispersion.

In certain exemplary embodiments of a process for preparing a pigment and wax dual dispersion as disclosed herein, a first step may be preparing a surfactant solution. In certain embodiments, the at least one surfactant may be combined with water in a container equipped with a stirring mechanism, such as, for example, a 1 gallon reactor equipped with a high shear blade agitator. The at least one surfactant and water may be mixed until the surfactant is completely dissolved. In certain embodiments, the at least one surfactant may be dissolved in at least about 10 minutes, at least about 15 minutes, at least about 20 minutes, at least about 25 minutes, or at least about 30 minutes. One skilled in the art would recognize that the time for dissolution may be affected by known variables such as the rate of stirring and the temperature of the solution. In certain embodiments, a portion of the surfactant solution may discharged into a separate container for later use. The at least one surfactant may be used to stabilize the pigment particles in the pigment dispersion. In certain embodiments, the at least one surfactant may be chosen from Taycapower BN2060, comprising 60% sodium dodecylbenzene sulfonate in water.

In certain embodiments, a second step in the process for preparing a pigment and wax dual dispersion may comprise a pigment pre-wetting step. In the pigment pre-wetting step, the at least one pigment, such as, for example, a cyan pigment powder, may be added to the container. The container charge port may then be closed and the agitator initiated. In this step, the pigment is wetted in the surfactant solution to obtain a pigment concentrate containing the desired percent solid. In certain embodiments, a pigment concentrate of about 35% to about 60% solid is obtained, such as about 45% to about 50% solid. In certain embodiments, the pigment may be chosen from a carbon black pigments and cyan pigments, such as PB 15:3 available from Sun Chemicals.

As disclosed herein in certain exemplary embodiments, a third step in the process for preparing a pigment and wax dual dispersion may comprise forming a pigment dispersion. In the pigment dispersion step, a rotor-stator homogenizer (for example a high shear in-line homogenizer such as a Cavitron®) may be turned on to allow the pigment dispersion to circulate in a pigment dispersion loop. A reactor jacket may be cooled with water, and there may be an inline heat exchanger downstream of the rotor-stator homogenizer for cooling the pigment dispersion. The dispersion operation may last until dispersion is complete. For example, in certain embodiments, the pigment dispersion step may last for at least about 30 minutes, at least about 75 minutes, or at least about 90 minutes.

After completion of the dispersion operation, additional deionized water may be charged into the reactor to dilute the pigment concentrate. In certain embodiments, the pigment concentrate may be diluted to less than about 50% solids, such as less than about 25% solids or less than about 20% solids. In certain embodiments, the pigment concentrate may be diluted to about 15% solids, about 16% solids, about 17% solids, about 18% solids, or about 19% solids. A sample of the diluted pigment dispersion may be taken for particle size measurement, solids content, and other desired analyses.

A fourth step in the preparation of the pigment and wax dual dispersion process disclosed herein is the preparation of the dual dispersion with the wax. Prepared surfactant solution from the first aforementioned steps and at least one wax, such as IGI wax pellets, may be added to the previously formed pigment dispersion, such as a cyan pigment dispersion, in the container. The wax dispersion loop may be set to an increased temperature, such as about 100° C., about 120° C., or about 125° C. The desired temperature of the wax dispersion loop, as would be recognized by those of ordinary skill in the art, will depend upon the melting point of the selected wax or waxes.

Once the wax dispersion loop reaches the desired temperature, a piston homogenizer (such as, for example, an APV Gaulin® homogenizer) may be turned on to disperse the wax. The homogenizer's primary and secondary stages may be set to desired pressures to achieve the desired dispersion, as would be recognized by those of ordinary skill in the art. For example, in certain embodiments, the primary stage may be set to about 5,500 psi, about 6,000 psi, or about 6,500 psi. In certain exemplary embodiments, the secondary stage may be set to about 700 psi, about 800 psi, or about 900 psi. In certain embodiments, the primary stage may be set to about 6,000 psi, and the secondary stage may be set to about 800 psi.

The wax dispersion step may run for any amount of time necessary to complete dispersion of the wax. In certain embodiments, the process may run for at least about 30 minutes, at least about 60 minutes, or at least about 75 minutes. After the wax dispersion has been formed, the piston homogenizer may be shut down, and the dispersion optionally discharged through a strainer, such as, for example, a 100 micron nylon bag. A sample may be taken for particle size measurement, solids content analyses, and other desired analyses.

The wax dispersion may be obtained by utilizing a known apparatus comprised of a homogenizer, such as a Gaulin® 15MR available from APV Homogenizer, connected to a container in a sealed and closed loop configuration, such as a one gallon stainless steel jacketed reactor with steam heating and water cooling capability and heating to a temperature higher than the peak melting point of the wax to melt the wax, such as from about 10° C. or more higher than the peak melting point of the wax.

Thereafter the resulting mixture is pumped through the homogenizer, which may comprise two valves in series comprised of a primary valve that operates at high pressure, such as up to 8,000 pounds per square inch (psi), during homogenization, and a secondary valve that operates at lower pressures of up to about 1,000 pounds per square inch (psi). The homogenizer, which may generate emulsions or dispersions in a fluid mixture under pressure, is initially operated in a pre-emulsification mode where the primary valve is fully open and the secondary valve is partially closed to generate a pressure drop of about 800 to about 1,000 psi for a desired period of time, such as, for example, for at least about 3 theoretical passes, at least about 10 passes, or at least about 20 passes. The time for one theoretical pass may be calculated by the mixture volume divided by the volumetric flow rate through the homogenizer. More specifically, for a 4 liter mixture pumped at 1 liter per minute, one theoretical pass consumes about 4 minutes; likewise, 30 minutes of pre-emulsification is equivalent to about 7.5 theoretical passes.

After pre-emulsification, the primary valve may be partially closed to increase the homogenizer pressure to a desired pressure. The desired pressure may range from about 3,000 psi to about 8,000 psi. Emulsification is accomplished for a number of theoretical passes, which may range from about 3 to about 25 passes, or more, and wherein operating at a higher pressure for a longer time period results in a smaller wax particle size in the product. After completion of emulsification, the homogenizer may be disconnected, and the wax dispersion in the reactor may be cooled to ambient room temperature and discharged into a product container and/or filtered through a filter bag. For example, the wax dispersion may be filter through a filter bag having about 1 to about 500 micron pore size. Certain exemplary waxes that may be used in embodiments disclosed herein, in general, display melting points of, for example, from about 40° C. to about 110° C., and more specifically, from about 60° C. to about 100° C.

FIG. 1 is an illustration of an exemplary dispersion apparatus for preparing a pigment and wax dual dispersion as disclosed herein. In FIG. 1, a first container 110 can contain a solution that may be stirred by a stirring mechanism 120 such as, for example, a stirring blade. The first container 110 is connected to a pigment dispersion loop 200 and a wax dispersion loop 300 via a recirculation device 130, such as, for example, a tube.

In certain embodiments, such as that depicted, for example in FIG. 1, the first container 110 comprises a high shear blade mixer. The container 110 may also comprise a vent 160, a charge port 170, an inlet for hot glycol and/or steam 180, and an outlet for hot glycol and/or steam 190. An opening in the container 110 may be connected to both a wax dispersion loop 300 and a pigment dispersion loop 200 and may serve as an outlet for at least one of the pigment dispersion loop and the wax dispersion loop. The container 110 may also comprise an opening that may serve as an inlet connected to the pigment dispersion loop 200, and an opening that may serve as an inlet connected to the wax dispersion loop 300.

In the pigment dispersion loop 200, the first container 110 is operatively coupled to a rotor-stator type homogenizer 140 via the recirculation device 130. The rotor stator type homogenizer 140 comprises a rotor and a stator.

During operation of the dispersion apparatus, a solution comprising water and a surfactant, may be mixed in the first container 110 using the stirring device 120. Additionally, at least one pigment may be added to the first container 110 to form a pigment dispersion.

According to various exemplary embodiments, the pigment dispersion may be flowed to the rotor-stator homogenizer in the rotor-stator homogenizer 140. For example, the dispersion may be flowed in the space between the rotor and the stator, where the dispersion may be further subjected to the action of the rotor-stator homogenizer. When in the rotor-stator homogenizer, the pigment particles in the dispersion may be further reduced in size because of the action of the rotor-stator homogenizer. According to various exemplary embodiments, the pigment particle size may be reduced to below about 160 nm, such as, for example, below about 150 nm, below about 140 nm, below about 135 nm, below about 130 nm, or below about 125 nm.

After the dispersion passes through the rotor-stator homogenizer 140, the dispersion may be flowed back to the first container 110 via the recirculation device 130. Accordingly, the dispersion may be further stirred by the stirring device 120, and may repetitively be flowed back via the recirculation device 130 to the rotor-stator homogenizer 140, where the dispersion may be further subjected to the action of the rotor-stator homogenizer. Also, the dispersion coming out of the rotor-stator type homogenizer may optionally be flowed to another container for further processing that is different from the first container 110, before being recirculated back again into the rotor-stator homogenizer 140 to be subjected further to the action of the rotor-stator type homogenizer.

According to various exemplary embodiments, the recirculation loop may be set up by having a discharge outlet in the rotor-stator homogenizer 140. Pipes may be connected between the discharge outlet of the homogenizer 140 and the first container 110 via the recirculation device 130. The first container 110 may be connected to the homogenizer 140 in such a way that the dispersion in the rotor-stator homogenizer may flow to the first container 110 and back to the rotor-stator homogenizer in a substantially continuous manner. The recirculation of the dispersion back to the rotor-stator homogenizer allows the rotor-stator homogenizer to further reduce the size of the pigment particles dispersed in the dispersion each time the dispersion is recirculated in the rotor-stator homogenizer until a desired pigment particle size is achieved.

In certain exemplary embodiments and as shown in FIG. 1, the wax dispersion loop 300 may comprise a steam jacketed loop 310 as part of the recirculation device 130 connected to the container 110 and a piston homogenizer 320. The piston homogenizer 320 may be connected to a second opening in the container 110, thereby forming a circulation loop between the container 110 and the piston homogenizer 320. In certain embodiments, the piston homogenizer may also be coupled via the recirculation device 130 to the pigment dispersion loop 200.

The pigment dispersion loop 200 may comprise a heat exchanger for cooling 210 and/or a strainer 220. In certain embodiments, the rotor-stator homogenizer may be continuous high shear homogenizer mixer, such as a Cavitron®.

According to various exemplary embodiments, the amount of solid pigment mixed in the solution to form the dispersion may be about 20% or more based on the combined total weight. A smaller particle size of the solid pigment is generally obtained with higher concentrations of solid pigment in the dispersion. Therefore, a method is provided herein where the final pigment particle size can be controlled by the pigment concentration. For the smallest possible pigment particle size, pigment concentration greater than about 35% by weight may be used. Very small pigment particles may be obtained by operating the rotor-stator type homogenizer in a recirculation mode, and by formulating the pigment dispersion with high pigment concentrations.

Because there may be some heating in the second container 140 caused by the homogenizer, the water temperature may be increased by more than about 5° C. in the rotor-stator homogenizer 140. Cascade control may be used to control the reactor temperature and prevent any excessive heating.

According to exemplary embodiments, various suitable pigments may be employed in dispersions as disclosed herein, including, but not limited to, carbon black, such as Regal 330 carbon black, Nipex35, acetylene black, lamp black, aniline black, Chrome Yellow, Zinc Yellow, Sicofast Yellow, Sunbrite® Yellow, Novaperm Yellow, Chrome Orange, Cadmium Red, Lithol® Scarlet, Hostaperm® Red, Fanal® PINK, Hostaperm® Pink, Lithol® Red, Rhodamine Lake B, Brilliant Carmine, Heliogen® Blue, Hostaperm® Blue, PV Fast® Blue, Cinquasia® Green, Hostaperm® Green, and mixtures thereof.

Illustrative examples of suitable known surfactants or stabilizers selected for the processes disclosed herein include alkyl sulphates such as sodium dodecyl sulphate and sodium laural sulphate, alkyl benzene sulphonates such as sodium dodecylbenzene sulphonate, commercially known as Neogen R-K, Rhodacal DS-10 and Taycapower BN2060, etc., alkyl phenyloxide sulphonates such as sodium dodecylphenyloxide sulphonate, and the like. The concentration of surfactant in the aqueous phase depends on the type of surfactant and the pigment. A typical surfactant to pigment weight ratio may range from about 3% to about 30%, although ratios outside of this range are also possible.

Wax particles in a wax dispersion may be stabilized with at least a surfactant. In certain embodiments, the desired particle size of the wax may be attained, for example, by controlling the concentration of wax, the concentration of the stabilizer, and apparatus and process variables such as temperature, pressure and time. The wax may be chosen from natural waxes, such a carnauba wax, paraffin wax, montan wax; synthetic waxes, such as microcrystalline polymethylene wax, polyethylene wax, polybutylene wax, polyethylene-acrylic wax, polyester wax, polyamide wax, or Fischer-Tropsch wax, mixtures thereof and the like. In certain embodiments the wax dispersion possesses, for example, a particle size diameter of from about 10 to about 500 nanometers.

Numerous processes, such as, for example emulsion aggregation, are within the purview of those skilled in the art for the preparation of inks, toners, cosmetics, paints, and other coating compositions.

Unless otherwise indicated, all numbers used in the specification and claims are to be understood as being modified in all instances by the term "about," whether or not so stated. It should also be understood that the precise numerical values used in the specification and claims form additional embodiments of the disclosure, as do all ranges and subranges within any specified endpoints. Efforts have been made to ensure the accuracy of the numerical values disclosed in the Example. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary.

It is to be understood that both the foregoing description and the following example are exemplary and explanatory only and are not intended to be restrictive. In addition, it will be noted that where steps are disclosed, the steps need not be performed in that order unless explicitly stated.

The accompanying figures, which are incorporated in and constitute a part of this specification, are not intended to be restrictive, but rather illustrate embodiments of the disclosure.

Other embodiments will be apparent to those skilled in the art from consideration of the specification and practice of the disclosure.

Example—Preparation of Dual Dispersion (Cyan and Wax) in a One-Pot Homogenization Process The following example is not intended to be limiting of the disclosure.

About 59.7 grams of Taycapower paste anionic surfactant comprised primarily of branching sodium dodecyl benzene sulphonate was added to about 998.7 grams of deionized water in a 3 L plastic beaker and mixed with an overhead agitator for a period of about 20 minutes. About 398.33 grams of IGI polyethylene wax having a melting point of 90.71° C., about 1639.1 grams of a previously prepared cyan pigment dispersion having a solid content of about 16.2% and a surfactant level at about 9.0 pph, and the prepared surfactant solution were added into a 1 gallon reactor and stirred at about 500 revolutions per minute.

The mixture was heated to about 120° C. in order to melt the wax. The aqueous mixture containing the molten wax was then pumped through a Gaulin® 15MR piston homogenizer at a rate of about 1 liter per minute for a period of about 20 minutes with the primary homogenizing valve fully open and the secondary homogenizing valve partially closed, such that the homogenizing pressure was about 800 psi. Then the primary homogenizing valve was partially closed such that the homogenizing pressure increased to about 6000 psi. The reactor mixture was kept at about 120° C. and circulated through the homogenizer at about 1 liter per minute for about 45 minutes. Thereafter, the homogenizer was stopped, and the reactor mixture was cooled to room temperature, filtered through a 100 micro filter bag, and discharged into a 4 L container. No coarse particles were collected.

Figure 2:
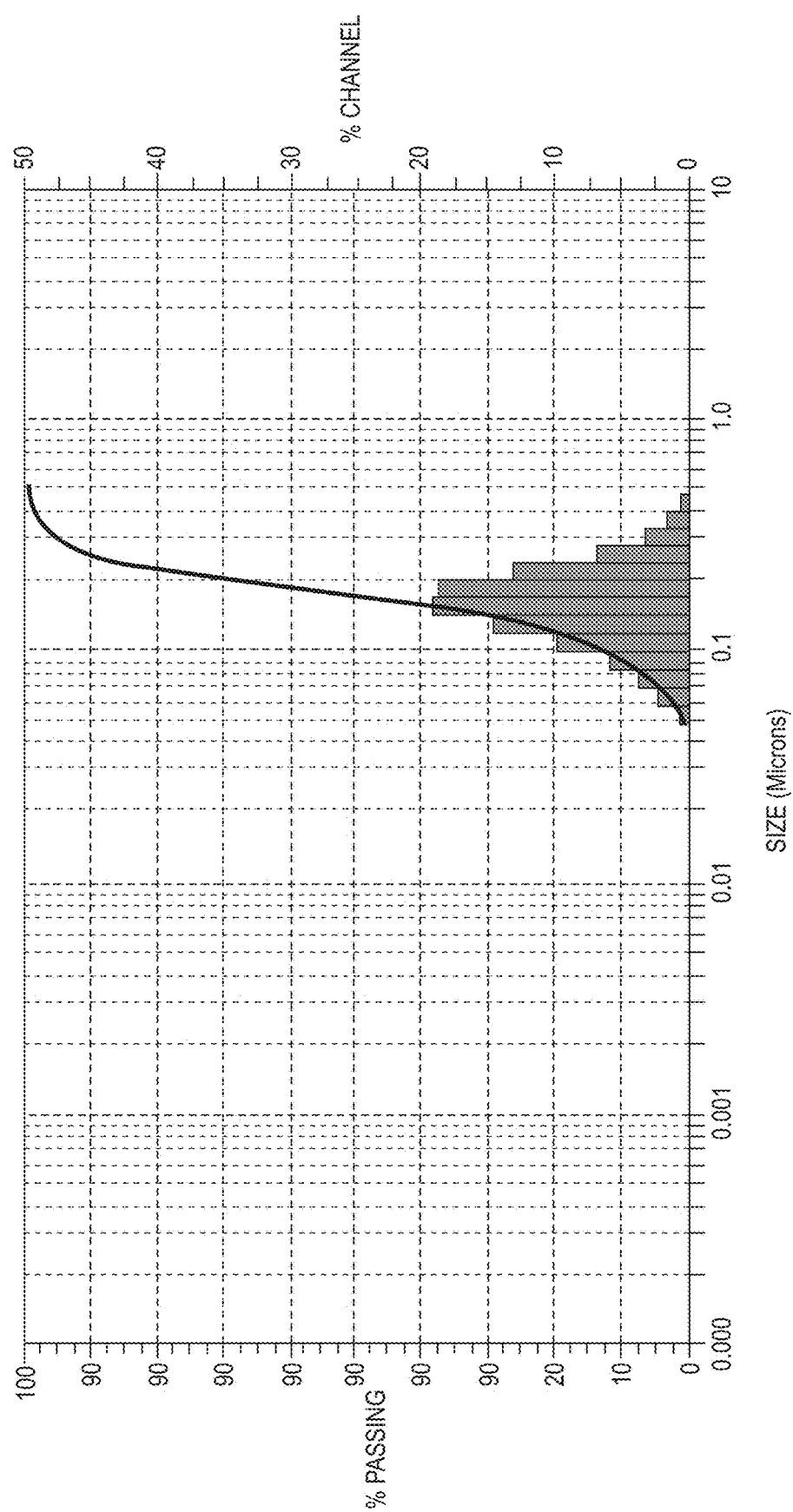
FIG. 2 is a graph depicting the particle size distribution for the pigment and wax dual dispersion composition produced in accordance with Example 1 of the present disclosure.

The resulting pigment and wax dual dispersion was comprised of about 21.2% of wax/pigment, about 1.87% of surfactant, and had a volume average diameter of about 163.1 nanometers as measured with a Nanotrac particle size analyzer. The particle size trace is shown in FIG. 2.

Table 1 below illustrates the formulation used to create the exemplary pigment and wax dual dispersion disclosed herein.

TABLE 1

| Formulation | Solid (g) | Ratio | Surfactant level (pph) | 60% Surfactant (wt) | DIW added (g) | S.C (%) | Dispersion (g) |
|---|---|---|---|---|---|---|---|
| wax | 398.33 | 0.62 | 9 | 59.7 | 998.7 | 30.0 | 1447.3 |
| pigment | 243.45 | 0.38 | 9 | 36.5 | 1364.9 | 16.2 | 1639.1 |
| Total | 641.78 | 1.00 | | | | 22.67 | 3086.30 |

The obtained pigment and wax dual dispersion was stable, and no sediment was observed.

In this experiment, the components used in the formulation such as surfactant, pigment, wax and deionized water are identical to those were applied in the pigment dispersion process and in the wax dispersion process, respectively. The process parameters such as the reactor temperature, mixing speed, homogenization passes, and pressure were also the same as those that were implemented in the individual processes.

What is claimed is:

1. A process for preparing a pigment and wax dual dispersion comprising:
   providing a solution comprising water and at least one surfactant in a dispersion apparatus comprising a container, a rotor-stator homogenizer, and a piston homogenizer coupled via a recirculation device;
   adding at least one pigment to the solution in the container;
   flowing the at least one pigment and solution from the container, through a first loop, and back to the container via the recirculation device to produce a pigment dispersion, wherein the first loop comprises a strainer, the rotor-stator homogenizer downstream from the strainer, and a heat exchanger downstream from the rotor-stator homogenizer, wherein the rotor-stator homogenizer reduces a particle size of the pigment dispersion to less than 125 nm, and wherein the heat exchanger reduces a temperature of the pigment dispersion;
   stirring the pigment dispersion in the container;
   adding at least one wax to the pigment dispersion in the container; and
   flowing the wax and the pigment dispersion from the container, through a second loop, and back to the container via the recirculation device to produce the pigment and wax dual dispersion, wherein the second loop comprises the piston homogenizer, wherein the recirculation device in the second loop comprises a steam jacket, wherein the pigment and wax dual dispersion is exposed to a pressure in the piston homogenizer between 700 psi and 900 psi for a first period of time, and subsequently the pressure to which the pigment and wax dual dispersion is exposed in the piston homogenizer is between 5500 psi and 6500 psi for a second period of time.

2. The process according to claim 1, wherein the at least one pigment is chosen from cyan pigments, and wherein the at least one pigment comprises solids in an amount less than 17%.

3. The process according to claim 1, further comprising mixing the water and the at least one surfactant together with an agitator to provide the solution prior to adding the at least one wax.

4. The process according to claim 1, wherein the at least one wax is chosen from polymethylene wax.

5. The process according to claim 1, wherein the at least one surfactant is chosen from 60% sodium dodecyl benzene sulfonate.

6. The process according to claim 1, wherein the pigment and wax dual dispersion is prepared at a temperature ranging from 120° C. to 130° C. and then subsequently cooled to ambient temperature.

7. The process according to claim 1, wherein the at least one pigment is added in an amount of at least 20% by weight of the pigment dispersion.

8. The process according to claim 1, wherein the pigment dispersion is recirculated through the rotor-stator homogenizer via the recirculation device at least 3 passes.

9. The process according to claim 1, wherein the pigment dispersion is diluted with the water to an amount of less than 25% pigment solids by weight.

10. The process according to claim 1, wherein the pigment dispersion is diluted with the water to an amount of less than 20% pigment solids by weight.

11. The process according to claim 1, wherein the pigment and wax dual dispersion comprises the at least one pigment and the at least one wax in a combined amount greater than 20%, the at least one surfactant in an amount greater than 1%.

* * * * *